Oct. 14, 1952 J. R. HOBSON Re. 23,564

MULTIPLE CAVITY MOLD

Original Filed Aug. 12, 1947 2 SHEETS—SHEET 1

INVENTOR.
JOHN R. HOBSON
BY Parham + Bates
ATTORNEYS

MULTIPLE CAVITY MOLD

Original Filed Aug. 12, 1947 2 SHEETS—SHEET 2

INVENTOR.
JOHN R. HOBSON
BY Parham + Bates
ATTORNEYS

Reissued Oct. 14, 1952

Re. 23,564

UNITED STATES PATENT OFFICE 23,564

MULTIPLE CAVITY MOLD

John R. Hobson, West Hartford, Conn., assignor to Plax Corporation, Hartford, Conn., a corporation of Delaware Original No. 2,541,249, dated February 13, 1951, Serial No. 768,163, August 12, 1947. Application for reissue March 13, 1951, Serial No. 215,370

23 Claims. (Cl. 18—5)

Matter enclosed in heavy brackets [ ] appears in the original patent but forms no part of this reissue specification; matter printed in italics indicates the additions made by reissue.

This invention relates to the production of hollow articles, such as containers, from plastic materials which are capable of being softened and made workable by heating at relatively low temperatures and which may be expanded under fluid pressure into articles of desired shapes, and thereafter, rigidified. More particularly, the present invention relates to a novel multiple mold mechanism by means of which a plurality of articles may be simultaneously formed in the manner indicated.

It has previously been proposed (see U. S. Patents to Kopitke No. 2,260,750 issued October 28, 1946, and No. 2,349,176 issued May 16, 1944) to make hollow articles, such as, for example, containers and ornamental Christmas tree balls, from organic plastic materials by first forming the material into a tubular form, closing the leading end of the tubular body of material, extruding the tubular body from confinement as a closed-ended hollow body and blowing the closed tubular body into a single article within a mold and then to sever the blown or expanded article from the remaining tubular material. A modification of this procedure involves pinching the leading end of the tubular material between the mold sections to form a closure either as an alternative or in addition to the aforementioned preclosing of the leading end.

The present invention provides improvements over molding methods and apparatus heretofore used to make hollow articles and has for its general object more economical production of such articles.

A further object of the invention is to provide a mold structure having a plurality of molding cavities in which to form a plurality of articles in a single molding operation.

A further object is to provide mechanism for closing the tubular material at a series of spaced points; and to so affect the closing of the material as to seal fluid pressure within each of a series of articles during a single molding operation. The manner in which the above and other objects and advantages are accomplished or obtained will be pointed out or made apparent from the detailed description which follows and which has reference to the accompanying drawings which show two forms of molding apparatus embodying the invention.

Figure 1:
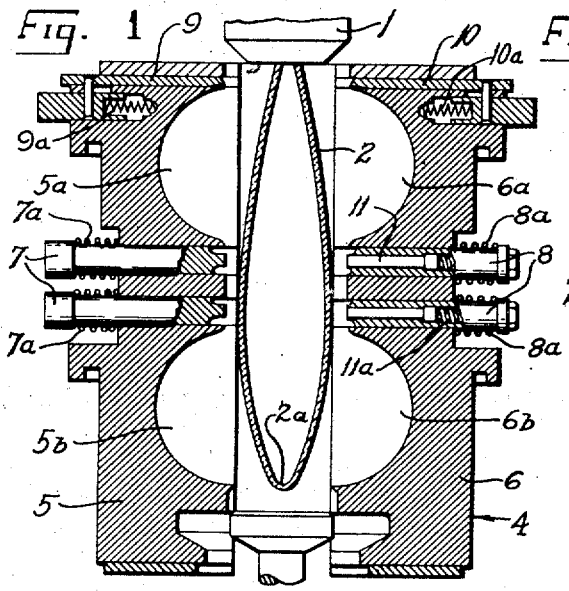
Fig. 1 is a vertical section of a double cavity mold in open position and showing a tube of plastic material all in accordance with one embodiment of the present invention.

Referring more particularly to Figs. 1 to 4, inclusive, there is illustrated the outlet or extrusion end 1 of a nozzle from which thermoplastic material is extruded in a tubular form 2. For details of a suitable extruder and extruder nozzle of which the outlet end 1 is a part, reference may be had to the aforementioned patents to Kopitke. The closing of the leading end 2*a* of the tubular material is effected by the smearing action of a cut-off knife blade 3 following completion of the preceding forming action. Thereafter the tubular material is extruded from the nozzle 1 as an elongated bubble from which a plurality of molded articles are formed by the molding mechanism indicated generally by the numeral 4 in Figs. 1 to 4 of the drawings.

Figure 2:
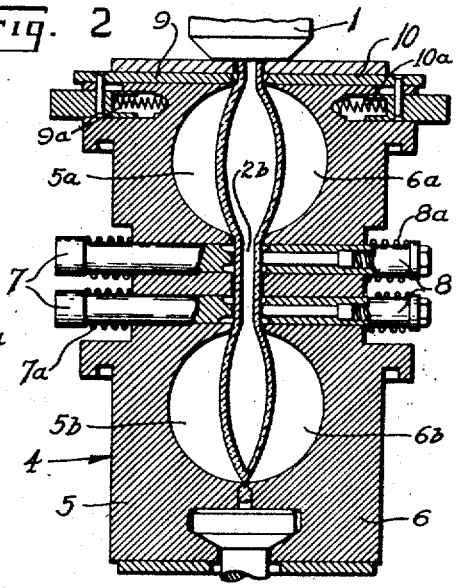
Fig. 2 is a view similar to Fig. 1 showing the mold members in their closed or molding position.
Figure 3:
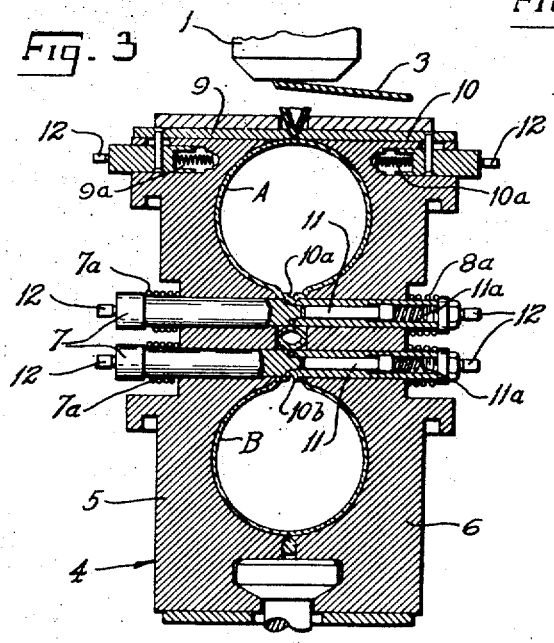
Fig. 3 is a view similar to Fig. 2 showing the plastic tubing blown to form two ornamental spheres or balls within the mold cavities.
Figure 4:
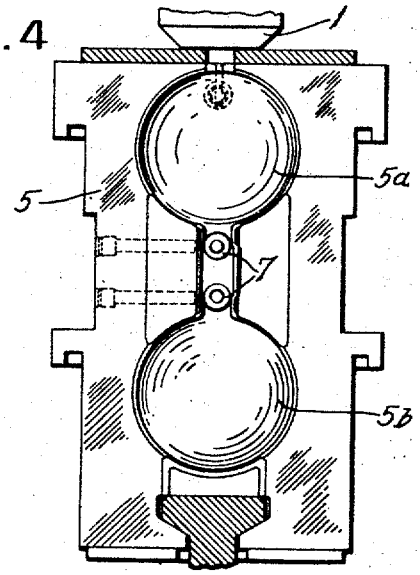
Fig. 4 is a front elevation of the parting face of one of the mold sections shown in Figs. 1 to 3.

Referring more particularly to the details of the molding mechanism 4, it includes a pair of mold cavity members 5 and 6 which meet in a vertical plane and which are adapted to be moved between the two positions illustrated in Figs. 1 and 2. In the embodiment illustrated the interiors of the molds are shaped to form Christmas tree balls A and B and to that end have upper and lower spherical cavities 5*a*, 6*a* and 5*b*, 6*b*, respectively, and are provided with a pair of eyelet forming mechanisms intermediate the two spherical cavities. Each eyelet forming mechanism comprises a pair of opposing plungers 7 and 8 which are slidably mounted respectively in the mold halves 5 and 6. The plungers 7 and 8 are respectively held retracted under compression by springs 7a and 8a which force the plungers outwardly to their normal or open positions. The ends of the plungers are so shaped that when pressed toward each other they close the tubular connection 2b (Fig. 2) between the two plastic spheres at two points and, at the same time, as shown in Fig. 3, form eyelets or rings 10a and 10b on the respective spheres A and B. The plungers 8 are axially recessed to receive the plastic displaced by the ends of the plungers 7 in forming the center holes of the eyelets. An auxiliary plunger 11 is mounted for limited reciprocal movement in the recess of each plunger 8 and together with a compression spring 11a provides means for ejecting the plastic from the recesses in the plungers 8 following an eyelet forming operation.

The upper or following end of the tube 2 adjacent the blowhead 1 initially extends through an upper opening in the closed mold in tubular form so as to permit the introduction of air under pressure to blow the tubing 2 into contact with the mold cavities.

In addition to the eyelet or ring forming pinch-off members 7 and 8 the mold mechanism 4 is provided with cooperating pinch-off members 9 and 10 which are respectively mounted for horizontal reciprocal movement on the upper ends of the mold members 5 and 6. The pinch-off members 9 and 10 normally are held by springs 9a and 10a in their retracted or open positions. As shown in Fig. 3, the pinch-off members 9 and 10 are movable to a contacting or closed position for cutting off superfluous plastic material from the upper ball A and sealing the upper ball under pressure.

The mechanism for moving the pinch-off members 7, 8, 9 and 10 to the closed or cut-off positions illustrated in Fig. 3 may take a variety of forms, the details of which are not shown in the drawing, but which may be similar to the operating mechanism and described in the aforementioned Patent 2,249,176 to Kopitke, including the actuating ends 12 of adjustable contact screws similar to those indicated at 226d and 227d of the Kopitke patent. Similarly, the mold opening and closing mechanism for actuating the mold sections 5 and 6 is not illustrated, the mechanism illustrated in the aforesaid patent to Kopitke being illustrative of one type which may be here employed.

The operation of the mechanism thus far disclosed may be summarized as follows: A tubular supply 2 of plastic closed at its leading end 2a is extruded from the extrusion nozzle 1 in a heated and formable condition until an elongated bubble hangs within the open mold members 5 and 6, preferably with the closed end 2a slightly below the low point of the lower end cavity. Thereupon the mold members 5 and 6 are moved to their closed position pinching off the lower end 2a of the plastic bubble 2.

It will be appreciated that where in operation the lower end of plastic tube 2 is pinched between the mold sections 4 and 5, previous closing of the leading end 2a of the tube is optional. Immediately following the closing of the mold, air pressure is introduced through the nozzle 1 to blow the bubble into contact with the mold cavities as shown in Fig. 3. Thereupon plunger operating mechanism through pressure contact of the adjustment screws 12 with the pinch-off members 7, 8 acts to separate the two balls A and B and form the eyelets or rings 10a and 10b on each ball. Likewise the pinch-off members 9 and 10 are actuated to seal the upper end of the upper ball under pressure. Preferably, the plungers 7 and 8 are actuated slightly ahead of the pinch-off members 9 and 10.

While the above-described mold assembly is adapted to simultaneously produce from a single extruded plastic bubble two blown hollow articles sealed under pressure, it will be appreciated that, in forming Christmas tree ornaments, in accordance with the present invention, the extruded bubble might be formed into any desired additional number of like articles. Similarly, it will be apparent without additional drawings, that the position of the upper pair of plungers 7 and 8 could be interchanged with the pinch-off members 9 and 10. An advantage of the illustrated molding apparatus over such a modification lies in the fact that the thickness, temperature and other physical factors of the central portion of the bubble 2 are practically the same so that the eyelets or rings of each ball will be substantially the same in each of the final articles. Other alternative forms of the invention will suggest themselves to those skilled in the art.

It is also possible in accordance with the present invention to form a plurality of open ended blown articles such as bottles or like containers or a combination of open and closed articles such as illustrated in Figs. 5 through 8. In the embodiment of the invention there illustrated mold cavity members 13 and 14 in their closed positions, are provided with a single mold cavity constructed and shaped to form a series of three plastic bottles C, D and E, respectively, having externally threaded necks 15c, 15d and 15e. More particularly, the lower portion of the mold cavity has the shape of the two identical containers C and D joined at their necks 15c and 15d, and the upper portion of the cavity includes internal ribs or flanges 16 and 17 which are horizontally disposed and in the closed position of the molds abutting one another so as to provide bottom forming surfaces for the adjacent bottoms of bottles D and E. The flanges 16 and 17 have opposing slots which when the mold sections are closed, define an opening within which a plastic bubble 18 from the extruder nozzle 19 is not entirely pinched-off and, consequently, communication exists through a channel 20 between the portions of the bubble in the upper and lower cavities of the mold above and below the flanges 16 and 17. The connecting channel 20 formed between the adjacent bottoms of the two upper bottles D and E may be closed and sealed by means of pinch-off members 21 and 22 which are slidably mounted in the respective mold members 13 and 14 and normally retained in their retracted or open positions by springs 23. The inner ends 21a and 22a of the pinch-off members are recessed to accommodate the excessive plastic between the two container bottoms. Operation of the pinch-off members is effected by means of actuating mechanism including adjustable screws 12 of the type heretofore described. There is also provided a cut-off blade 24 for separating the plastic tubing from the extruder nozzle 19 and for closing the leading end of the tubular material within the nozzle by appropriate smearing action.

Figures 5, 6, 7, 8:
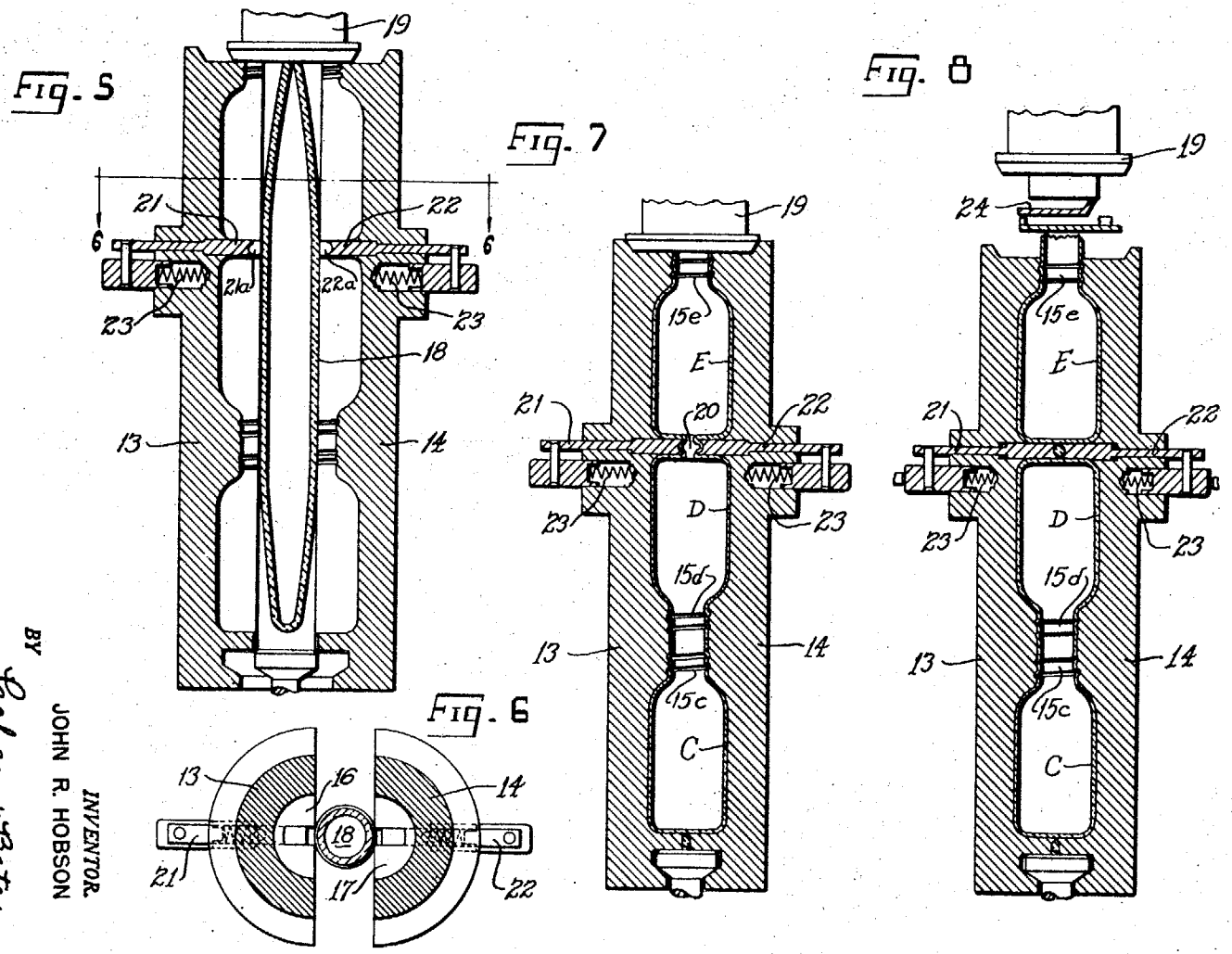
Fig. 5 is a vertical section of a second multiple cavity mold in open position and showing a tube of plastic material therein preparatory to being formed into three plastic containers.
Fig. 6 is a cross-sectional view taken on line 6—6 of Fig. 5.
Fig. 7 is a view similar to Fig. 5 showing the molding members in closed position.
Fig. 8 is a view similar to Fig. 7 showing a subsequent step in the forming of the containers.

The operation of the mold mechanism just described for producing the three bottles C, D and E is substantially as follows: The plastic tube 18 having a closed leading end is extruded as an elongated bubble from the extruder nozzle 19 downwardly into the space between the open mold cavity members 13 and 14. Thereupon, as illustrated in Fig. 7 the mold members are closed about the bubble and fluid pressure introduced to blow the bubble into contact with the mold cavity walls. While pressure is still maintained within the blown plastic, the pinch-off members 21 and 22 are actuated to close the communicating opening 20 between the bottoms of bottles D and E. Thereafter, the cut-off shear blade 24 acts to sever the plastic from the extrusion nozzle 19 and, at the same time, to smear the leading end of the plastic tubular material within the nozzle 19 preparatory to repeating the described cycle. By maintaining the two lower or connected containers C and D under pressure during the pinch-off operation, the described embodiment of the invention eliminates the possibility of either of the containers being collapsed by the action of the pinch-off members 21 and 22 even though the containers are not quite sufficiently rigidified before they are removed from the mold. Upon cooling of the connected containers, the two lower bottles C and D may be severed by means of suitable cutting mechanism (not shown).

While the embodiment described in connection with Figs. 5 to 8 illustrates the formation of only three containers in a single forming operation, it will be appreciated that in accordance with the invention a larger number could be produced. In the case of the formation of an even number of bottles, it is preferable to form them in connected pairs under pressure in the manner of C and D.

Various changes may be made in the details of construction and in the performance of the method without departing from the scope of the claims. The invention may be employed in forming tubing or hollow articles or containers from thermosetting as well as thermoplastic compositions, it being understood that where thermosetting compositions are employed, the articles will be hardened or rigidified by further heating rather than by cooling.

Having thus described my invention, what I claim is:

[1. The process of forming hollow articles of organic plastic material which comprises extruding a vertically suspended tube of such material from an extrusion nozzle, closing a sectional mold about the suspended tube, closing the leading end of said tube, admitting a gaseous pressure medium into said tube through a blowhead in said extrusion nozzle and expanding the closed tube to the shape of said mold, and sealing said tube at spaced points to form a plurality of spaced, sealed sections of said tubular material.]

2. The process of forming hollow articles of organic plastic material which comprises extruding a vertically suspended tube of such material from an extrusion nozzle, closing a sectional mold about the suspended tube, closing the leading end of said tube between the mold sections, admitting a gaseous pressure medium into said closed tube through a blowhead in said extrusion nozzle and expanding said closed tube to the shape of said mold, sealing said tube at spaced points to form a plurality of spaced, sealed sections of said tubular material, and separating the sealed sections within the mold.

3. The process of forming hollow articles of organic plastic material which comprises extruding a vertically suspended tube of such material having a closed leading end from an extrusion nozzle, closing a sectional mold about the suspended tube, admitting gaseous medium under pressure into said closed tube through a blowhead in said extrusion nozzle and expanding said closed tube to the shape of said mold, sealing said tube at spaced points while maintaining the gaseous medium under pressure and trapping said medium under pressure within spaced sections of said tubular material, and rigidifying and separating said spaced sections.

4. The process of forming hollow containers of organic plastic material which comprises extruding a vertically suspended tube of such material from an extrusion nozzle into a blow mold having a plurality of cavities, closing the leading end of said tube, admitting a gaseous medium under pressure into said tube through a blowhead in said extrusion nozzle and expanding said closed tube into forming contact with said mold cavities, sealing said tube at two points intermediate and one point outward of said cavities while maintaining the application of said pressure medium and trapping said medium under pressure within spaced sections of said tubular material, and separating said spaced sections.

5. The process of forming hollow articles of organic plastic material which comprises extruding a tube of such material from an extrusion nozzle, closing the leading end of said tube, expanding said closed tube with internal air pressure into a plurality of shaped articles in a mold having a plurality of article forming cavities, closing said tube at spaced points while maintaining the application of said pressure medium and trapping said medium under pressure within said spaced articles.

6. The process of forming hollow articles of organic plastic material which comprises closing a sectional mold about a tube of such material having a closed end, admitting gaseous pressure medium into said tube through a blowhead and expanding said closed tube to the shape of said mold, sealing said tube at spaced points while maintaining the application of said pressure medium and trapping said medium under pressure within spaced sections of said tubular material.

7. Apparatus for forming hollow articles from organic plastic material comprising a multi-section mold movable between opened and closed positions and having a plurality of connected mold cavities wherein a bubble of plastic material is expanded by a fluid pressure medium into a plurality of hollow articles, and means for closing said expanded bubble at spaced points and sealing the pressure medium in each of the plurality of hollow articles.

8. Apparatus for forming hollow articles from organic plastic material comprising a multi-section mold movable between opened and closed positions and having a plurality of connected mold cavities wherein a bubble of plastic material is expanded by a fluid pressure medium into a plurality of hollow articles, and means including a device for forming an eyelet on each of said articles for closing said expanded bubble at spaced points and sealing the pressure medium in each of the plurality of hollow articles.

9. Apparatus for forming hollow articles from organic plastic material comprising a multi-section mold movable between opened and closed positions and having a plurality of large mold cavities and a restricted connecting cavity wherein a tubing of plastic material is expanded by a fluid pressure medium into a series of connected hollow articles, and operable means for closing the portion of the tubing in the restricted connecting cavity, and operable means for closing the tubing and severing the hollow articles from the unexpanded tubing.

10. Apparatus for forming hollow articles from organic plastic material comprising a multi-section mold movable between opened and closed positions and having an elongated mold cavity including enlarged portions separated by a restricted portion wherein a single tube of plastic material is expanded by a fluid pressure medium, and means for severing and closing the expanded tube intermediate expanded portions.

11. The process of forming hollow articles of plastic material which comprises forming a tube of the material, closing a sectional mold about the tube, admitting a fluid pressure medium into the tube and blowing the tube into a plurality of connected blown articles within the mold, *pinching and* closing the blown tube at points spaced at least twice the length of one of the articles *while maintaining the blowing pressure in said articles,* and severing the blown tubing intermediate the closed points into a plurality of separate hollow articles each closed at at least one end.

12. The process of forming hollow articles of thermoplastic material which comprises forming of the material a tube at least twice the length of one of the completed articles, closing a sectional mold about the tube, closing one end of the tube, admitting a fluid pressure medium into the tube through the other end and blowing the tube within said molds into a plurality of connected blown articles, closing said tube at a point at least twice the length of one of the articles from said closed end *while maintaining the blowing pressure in said articles,* and severing the blown tubing intermediate the closed points into a plurality of separate hollow articles each closed at at least one end.

13. The process of forming hollow articles of thermoplastic material which comprises forming a tube of the material, closing a sectional mold about the tube, admitting a fluid pressure medium into the tube and blowing the tube into a plurality of connected blown articles, and *thereafter* closing said tube at a point intermediate adjacent blown articles.

14. The process recited in claim 13 and including severing the blown tubing into a plurality of hollow articles each closed at at least one end.

15. The process of forming hollow articles of thermoplastic material which comprises forming a tube of the material, closing a sectional mold about the tube, admitting a fluid pressure medium into the tube and blowing the tube into a plurality of connected blown articles, and *thereafter* closing and severing the blown tubing into a plurality of hollow articles each closed at at least one end.

*16. The method which comprises extruding thermoplastic material from a nozzle as a tube having a wall sufficiently soft to be molded, disposing each of spaced integral longitudinal portions of the tube in an individual blow mold cavity of a series of said cavities, each such portion having a length appropriate for a hollow article to be formed therefrom, pinching the tube at an end of each such portion, expanding each such portion of the tube in its blow mold cavity against the wall of said cavity by internally applied blowing pressure, stiffening the blown articles concurrently while held in contact with said cavities by the internal pressure and thereafter relieving the internal pressure within said cavities.*

*17. The method recited in claim 16 and wherein both ends of each said portion are pinched.*

*18. The method recited in claim 17 and including completely pinching closed the ends of said portions prior to their stiffening.*

*19. The method of molding a plurality of hollow articles of plastic material which comprises extruding a tube of the material having a wall sufficiently soft to be molded and of sufficient continuous length for a plurality of said articles, locating each of spaced longitudinal sections of said tube within an individual mold cavity formed by sectional mold parts, pinching closed portions of the tube intermediate said tube sections between cooperating mold parts to close the ends of said sections, concurrently holding the walls of said tube sections by fluid pressure against said mold cavities and at the same time hardening said material to form a plurality of spaced closed ended hollow articles connected by closed portions of said tube, and separating the hardened articles and relieving said fluid pressure, fluid pressure being applied within said sections after the sections are located in their mold cavities.*

*20. The method of molding a plurality of hollow articles of plastic material which comprises extruding a tube of the material having a wall sufficiently soft to be molded and of sufficient continuous length for a plurality of said articles, locating the spaced longitudinal sections of said tube within a plurality of individual mold cavities defined by sectional mold parts, pinching between cooperating mold parts portions of the tube at the ends of said tube sections and forming a passageway of smaller size than the unpinched tube into each section of tube and introducing fluid pressure through the passageways into the sections to expand and concurrently hold the walls of said sections against their mold cavities while said material is cooled and hardened to form a plurality of spaced hollow articles, and relieving said pressure after the articles have hardened.*

*21. The method recited in claim 20 and wherein the formation of the passageways is effected by said pinching operation.*

*22. The method recited in claim 20 and wherein said passages are closed prior to hardening of the plastic material.*

*23. The method of forming hollow articles comprising extruding as a tube a quantity of softened organic thermoplastic material sufficient for a plurality of articles, locating longitudinal sections of said tube within individual mold cavities, expanding said sections with internally applied fluid pressure into shaping engagement with their respective mold cavities and pinching closed ends of said sections to form the hollow articles, thereafter rigidifying the articles while concurrently in contact with the mold walls defining said cavities under said fluid pressure and while said ends are pinched closed, and relieving the internal fluid pressure.*

*24. The method recited in claim 23 and wherein at least some of said pinching is effected after said expansion of said sections.*

JOHN R. HOBSON.

(References on following page)

REFERENCES CITED

The following references are of record in the file of this patent or the original patent:

UNITED STATES PATENTS

| Number | Name | Date |
|---|---|---|
| 205,781 | Atterbury | July 9, 1878 |
| 752,674 | Hays | Feb. 23, 1904 |
| 1,543,506 | Miller | June 23, 1925 |
| 1,685,423 | Hurlburt | Sept. 25, 1928 |
| 1,848,940 | Delpech | Mar. 8, 1932 |
| 1,981,636 | Soubier | Nov. 20, 1934 |

| Number | Name | Date |
|---|---|---|
| 2,199,210 | Scherer | Apr. 30, 1940 |
| 2,205,837 | Ravenscroft et al. | June 25, 1940 |
| 2,260,750 | Kopitke | Oct. 28, 1941 |
| 2,321,319 | Rempel | June 8, 1943 |
| 2,349,177 | Kopitke | May 16, 1944 |

FOREIGN PATENTS

| Number | Country | Date |
|---|---|---|
| 15,868 | Great Britain | Oct. 7, 1890 |
| 11,055 | Sweden | June 2, 1900 |